United States Patent
Salahieh et al.

(10) Patent No.: US 10,298,914 B2
(45) Date of Patent: May 21, 2019

(54) LIGHT FIELD PERCEPTION ENHANCEMENT FOR INTEGRAL DISPLAY APPLICATIONS

(71) Applicant: INTEL CORPORATION, Santa Clara, CA (US)

(72) Inventors: Basel Salahieh, Santa Clara, CA (US); Ginni Grover, Santa Clara, CA (US); Gowri Somanath, Santa Clara, CA (US); Oscar Nestares, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 246 days.

(21) Appl. No.: 15/333,767

(22) Filed: Oct. 25, 2016

(65) Prior Publication Data
US 2018/0115770 A1  Apr. 26, 2018

(51) Int. Cl.
*H04N 13/305* (2018.01)
*G06T 7/11* (2017.01)
(Continued)

(52) U.S. Cl.
CPC ............. *H04N 13/305* (2018.05); *G06T 3/40* (2013.01); *G06T 5/00* (2013.01); *G06T 7/11* (2017.01);
(Continued)

(58) Field of Classification Search
CPC ........... H04N 13/0404; H04N 13/0409; H04N 13/004; H04N 13/0048; H04N 13/0022;
(Continued)

(56) References Cited

U.S. PATENT DOCUMENTS

| 8,290,358 B1 * | 10/2012 | Georgiev | ............... | G03B 35/10 396/326 |
| 8,831,367 B2 * | 9/2014 | Venkataraman | .......... | G06T 9/00 382/233 |

(Continued)

OTHER PUBLICATIONS

Adelson, Edward H. and James R. Bergen, "The Plenoptic Function and the Elements of Early Vision", Computational Models of Visual Processing, MIT Press, 1991, pp. 3-20.
(Continued)

*Primary Examiner* — Marnie A Matt
(74) *Attorney, Agent, or Firm* — Finch & Maloney PLLC (57) ABSTRACT

Techniques are provided for perception enhancement of light fields (LFs) for use in integral display applications. A methodology implementing the techniques according to an embodiment includes receiving one or more LF views and a disparity map associated with each LF view. The method also includes quantizing the disparity map into planes, where each plane is associated with a selected range of depth values. The method further includes slicing the LF view into layers, where each layer comprises pixels of the LF view associated with one of the planes. The method further includes shifting each of the layers in a lateral direction by an offset distance. The offset distance is based on a viewing angle associated with the LF view and further based on the depth values of the associated plane. The method also includes merging the shifted layers to generate a synthesized LF view with increased parallax.

24 Claims, 8 Drawing Sheets
(2 of 8 Drawing Sheet(s) Filed in Color)

(51) Int. Cl.

| | | |
|---|---|---|
| *H04N 13/122* | (2018.01) | |
| *H04N 13/307* | (2018.01) | |
| *H04N 13/31* | (2018.01) | |
| *H04N 13/161* | (2018.01) | |
| *H04N 13/128* | (2018.01) | |
| *H04N 13/156* | (2018.01) | |
| *G06T 5/00* | (2006.01) | |
| *G06T 3/40* | (2006.01) | |
| *G06T 7/60* | (2017.01) | |

(52) U.S. Cl.
CPC ............ *G06T 7/60* (2013.01); *H04N 13/122* (2018.05); *H04N 13/128* (2018.05); *H04N 13/156* (2018.05); *H04N 13/161* (2018.05); *H04N 13/307* (2018.05); *H04N 13/31* (2018.05); *G06T 2207/20112* (2013.01)

(58) Field of Classification Search
CPC ........... G06T 7/60; G06T 7/0081; G06T 3/40; G06T 5/00
See application file for complete search history.

(56) References Cited

U.S. PATENT DOCUMENTS

| | | | | |
|---|---|---|---|---|
| 8,885,059 | B1* | 11/2014 | Venkataraman | ........................... H01L 27/14618 348/218.1 |
| 2005/0146787 | A1* | 7/2005 | Lukyanitsa | ........ G02B 27/2214 359/462 |
| 2008/0043096 | A1* | 2/2008 | Vetro | ................... H04N 19/597 348/51 |
| 2011/0069189 | A1* | 3/2011 | Venkataraman | ........................... H01L 27/14618 348/218.1 |
| 2012/0195471 | A1* | 8/2012 | Newcombe | ............. G06T 7/194 382/106 |
| 2013/0315494 | A1* | 11/2013 | Venkataraman | .......... G06T 9/00 382/233 |
| 2014/0003732 | A1* | 1/2014 | Le Floch | ................. G06T 9/007 382/233 |
| 2014/0063077 | A1* | 3/2014 | Wetzstein | ................. G09G 3/36 345/690 |
| 2014/0232822 | A1* | 8/2014 | Venkataraman | ....... H04N 5/225 348/43 |
| 2014/0267243 | A1* | 9/2014 | Venkataraman | ........ G06T 7/557 345/419 |
| 2014/0327736 | A1* | 11/2014 | DeJohn | .............. H04N 13/0022 348/43 |
| 2014/0347361 | A1* | 11/2014 | Alpaslan | ................. G06T 15/50 345/426 |
| 2015/0170370 | A1* | 6/2015 | Ukil | ...................... G06T 7/0075 382/154 |
| 2015/0178939 | A1* | 6/2015 | Bradski | ................ G02B 27/017 345/633 |
| 2015/0201176 | A1* | 7/2015 | Graziosi | ............. H04N 13/111 348/43 |
| 2016/0005228 | A1* | 1/2016 | Niebla, Jr. | ........... H04N 13/122 348/43 |
| 2016/0021355 | A1* | 1/2016 | Alpaslan | ................ H04N 13/30 348/43 |
| 2016/0259305 | A1* | 9/2016 | Chen | ..................... G05B 11/44 |
| 2017/0256059 | A1* | 9/2017 | Tosic | ................... H04N 13/128 |
| 2018/0184066 | A1* | 6/2018 | Salahieh | ............... G06F 3/1423 |

OTHER PUBLICATIONS

Levoy, Marc and Pat Hanrahan, "Light Field Rendering", Proc. AMC Siggraph, 1996, 12 pages.

Roberts, D.E., "History of Lenticular and related Autostereoscopic Methods", Leap Technologies, LLC., 2003, 17 pages.

Halle, Michael W., "Multiple Viewpoint Rendering for Three-Dimensional Displays", Proc. AMC Siggraph, 1998, 12 pages.

Atalay, F. Betul and David M. Mount, "Interpolation over Light Fields with Applications in Computer Graphics", Proc. of ALENEX, 2003, 13 pages.

Zhang, Cha and Tsuhan Chen, "Light Field Sampling", Morgan & Claypool Publishers, 2006, 102 pages.

Bi, T., et al. "A novel approach of generating stereoscopic images using defocus", Society for Imaging Science and Technology, 2016, 9 pages.

Park, J.H. et al., "View image generation in perspective and orthographic projection geometry based on integral imaging", Optical Express, Jun. 2008, vol. 16, 14 pages.

Park, J.H. et al., "Recent progress in three-dimensional information processing based on integral imaging", Applied Optics, Dec. 2009, vol. 48, pp. H77-H94.

\* cited by examiner

LIGHT FIELD PERCEPTION ENHANCEMENT FOR INTEGRAL DISPLAY APPLICATIONS

BACKGROUND

Light fields provide the most complete representation of a scene, as they describe the intensity of light rays emitted from any position, and in any direction, in a real world coordinate system. If captured with sufficient sampling, it is possible to steer multiple light field views back to an observer within a viewing zone in the coordinate system by means of an integral display comprising, for example, a two dimensional (2D) elemental image display and a 2D array of microlenses (or lenticular sheet). The integral display enables 3D perception of the captured scenes without requiring special glasses or goggles. However, due to the limited spatial resolution of the integral display (as inherently defined by the microlens pitch), the densely captured light fields must typically be spatially under sampled so that they can fit the display resolution. Traditionally, this is accomplished using 2D interpolation which locally averages the spatial pixels within a window to produce an under sampled version of the original light field views. In the case where neighboring pixels of the light field view belong to different depth planes in 3D world coordinates, this under sampling can result in relatively shallow depth perception (e.g., parallax) on the integral display, producing unsatisfactory results. Alternatively, a 4D interpolation of the light field, based on spatio-angular local averaging, may be employed. This approach, however, may only provide limited enhancement of the synthesized views, but at greatly increased computational cost and with restricted rendering possibilities.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for light field (LF) perception enhancement on integral displays. Three-dimensional (3D) visualization, using captured light fields projected through an integral display, can provide a relatively high quality and realistic 3D perception experience for the viewer, without the requirement for special glasses or goggles. Resampling is typically required, however, due to the relatively lower resolution of available integral display devices, and this resampling can reduce the desirable parallax effects of a realistic 3D image, resulting in shallow depth content. The disclosed techniques address this problem by slicing the LF data into layers based on depth, and laterally shifting each layer by an offset distance with respect to the other layers. The offset distance is based on the distance of that layer with respect to a reference plane, and on the viewing angle. The shifted layers are recombined prior to display, resulting in enhanced parallax and improved 3D perception.

In accordance with an embodiment, the disclosed techniques can be implemented, for example, in a computing system or a graphics processing system, or a software product executable or otherwise controllable by such systems. The system or product is configured to receive one or more LF views and a disparity map associated with each LF view. In some embodiments, the LF views may be provided by a plenoptic camera, and the disparity maps may be calculated from the LF views or provided from a depth camera. The system is further configured to quantize the disparity maps into planes, where each disparity plane is associated with a selected range of depth values. The LF views are then sliced into layers, where each layer comprises pixels of the LF view associated with one of the disparity planes. The layers are then shifted or translated in a lateral direction (e.g., in the plane of the layer) by a calculated offset distance. The offset distance is based on the viewing angle associated with the LF view and on the depth values of the associated disparity plane with respect to a reference zero disparity plane. The system is further configured to merge the shifted layers and fill any missing or occluded data to generate a synthesized LF view with increased parallax.

In some embodiments, the resulting synthesized LF view images may be displayed through an integral display device providing a 3D viewing experience with increased parallax as the user moves within the viewing region of the display. Additionally, in some embodiments the system is configured to enable the user to experience different modes of display by adjusting operational parameters, for example to translate the location of rendered objects through the display surface, and to stretch or compress the perceived depth of field.

The techniques described herein may allow for improved LF perception, compared to existing methods that use 2D or 4D interpolations which provide limited improvement at greater computational cost. The disclosed techniques can be implemented on a broad range of computing and communication platforms, including mobile devices, since the techniques are more computationally efficient than existing methods. These techniques may further be implemented in hardware or software or a combination thereof.

Figure 1:
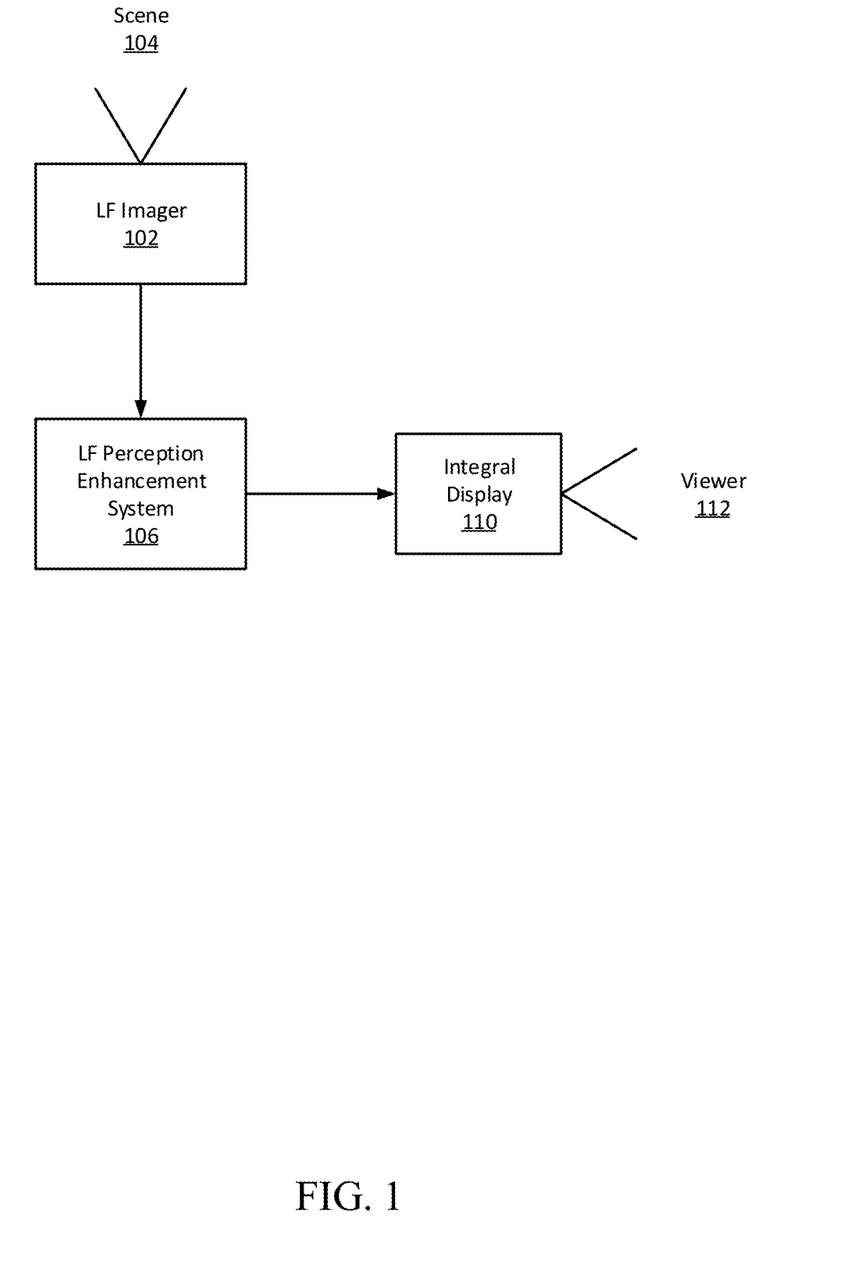
FIG. 1 is a top level diagram of an implementation of a system for light field perception enhancement, configured in accordance with certain embodiments of the present disclosure.

FIG. 1 is a top level diagram 100 of an implementation of a system for light field perception enhancement, configured in accordance with certain embodiments of the present disclosure. A light field imager 102 is shown to capture light fields of a scene 104 which may contain any number of objects at varying distances from the imager. In some embodiments, the light field imager 102 may be a plenoptic camera, a multi-camera array, or any other suitable light field imaging device. A light field perception enhancement system 106 is configured to process the provided LF data to enhance parallax effects and improve the 3D perception of the scene when presented to the viewer 112 through the integral display 110. The operation of the LF perception enhancement system 106 will be described in greater detail below.

Figure 2:
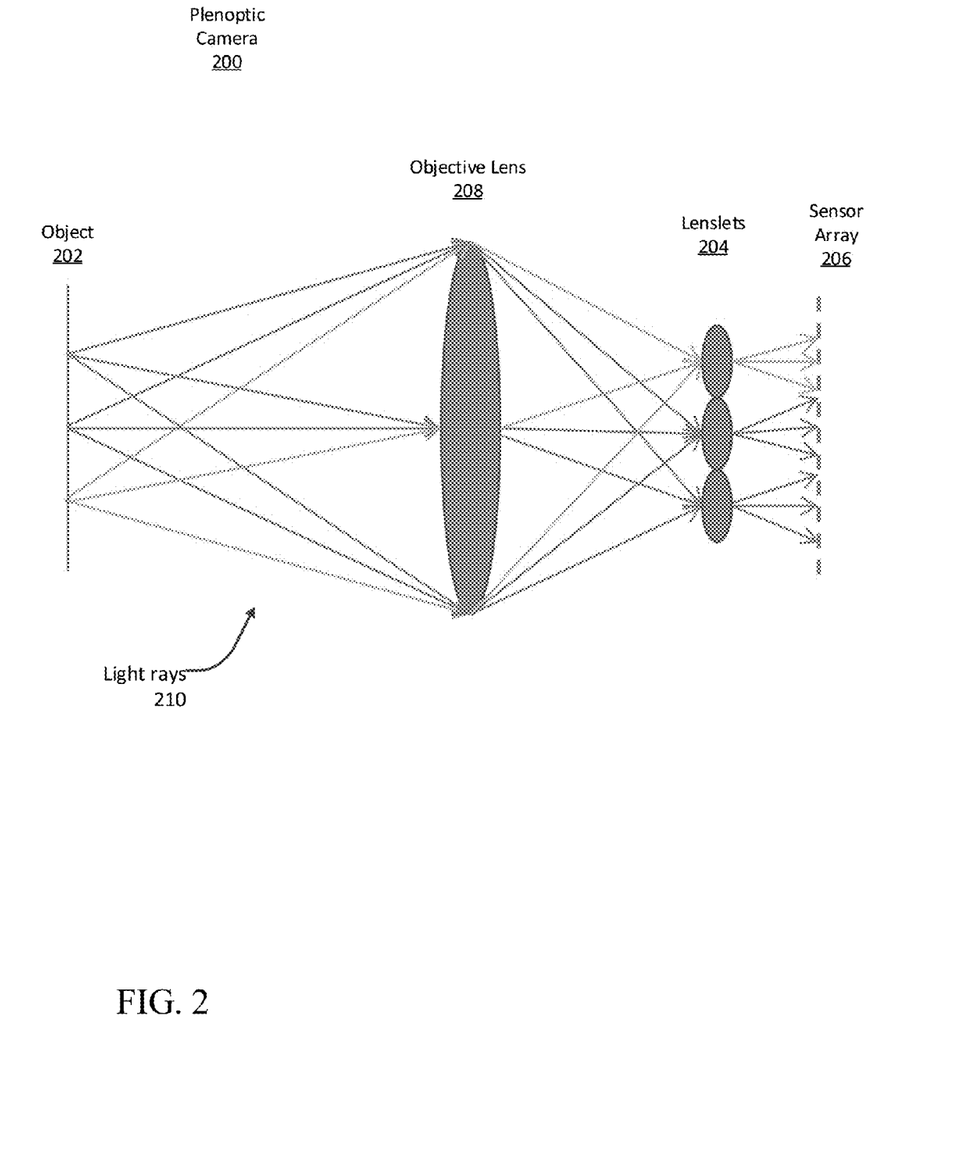
FIG. 2 illustrates the operation of a plenoptic camera to provide light field views, configured in accordance with certain embodiments of the present disclosure.

FIG. 2 illustrates the operation of a plenoptic camera 200 to provide light field views, configured in accordance with certain embodiments of the present disclosure. The plenoptic camera 200 is one example of a light field imaging device 102 and is configured to capture information about the light field emanating from a scene or object 202. The light field information includes both the spatial intensity of the emitted light rays and the directional distribution of those light rays over multiple color channels. The term "intensity," which is generally equivalent to luminance, is used herein, but it will be appreciated that the disclosed techniques are applicable to color (e.g., RGB) or gray scale images. Note that a conventional camera captures only the intensity of the light rays, but not the more comprehensive light field data, since directional content is lost through integration on the same sensor.

Plenoptic camera 200 is shown to include an objective lens 208 which gathers the light rays emanating from (or reflected from) object 202 and focuses those rays on a 2D array of microlenses (or lenslets) 204 at a focal image plane of the objective lens. Each lenslet then directs the light rays, captured from different directions, to different locations on the 2D sensor array 206 so that angle information (which is also recorded as intensity) is retained along with the spatial content. This allows the sensor array to capture a representation of the light field view data, or some portion thereof. In some embodiments, the LF imager 102 may be an integral imaging device comprising microlenses configured to capture an image of the object as seen from the viewing angle of that microlens. In some embodiments, the LF imager 102 may be a hybrid combination where microlenses sample both spatial and angular image data. In some embodiments, the LF imager 102 may be a multi-camera array affording a relatively wider baseline between views from each camera and thus greater parallax. It will be appreciated that the disclosed techniques are applicable to a system that employs any of these LF imaging devices. The disclosed techniques may be particularly advantageous for LF imaging devices such as the plenoptic camera, which has a smaller baseline since all views are captured form a single camera location, which generally results in limited parallax on the integral display. The disclosed techniques transform such data so that it appears as if the data was captured by an imaging system having a larger baseline, resulting in improved parallax.

Figure 3:
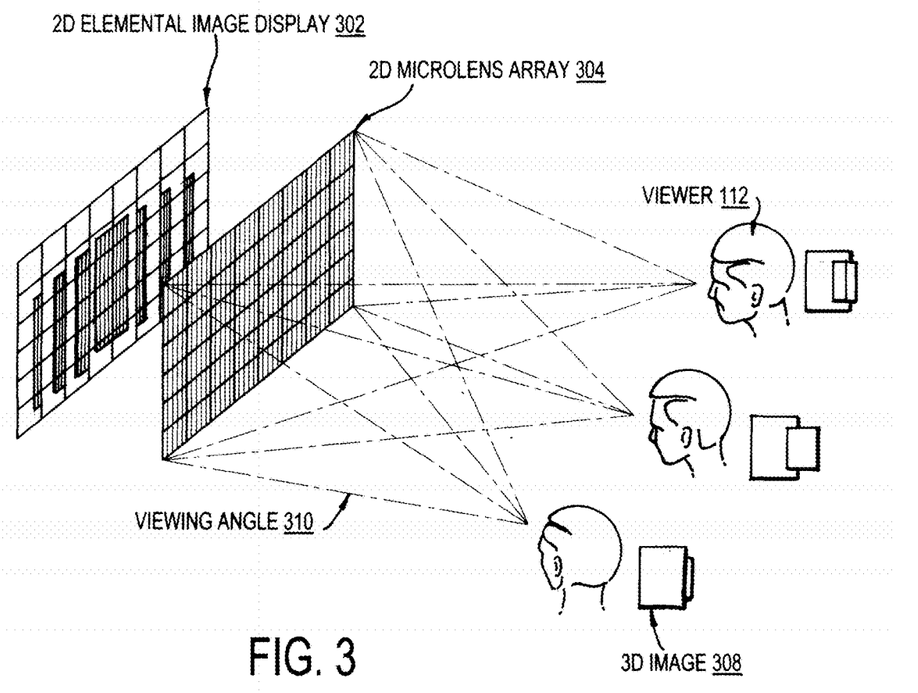
FIG. 3 illustrates the operation of an integral display, configured in accordance with certain embodiments of the present disclosure.

FIG. 3 illustrates the operation of an integral display 110, configured in accordance with certain embodiments of the present disclosure. The integral display 110 operates in essentially the reverse manner of the LF imager 102. The light field view data is displayed on a 2D elemental image display 302 which is then projected through a 2D microlens array 304. Each lenslet of the array projects light rays from a region of the object that would have been visible to the viewer 112 from that viewer's location and viewing angle 310, thus providing a 3D image 308 associated with that viewing angle.

Figure 4:
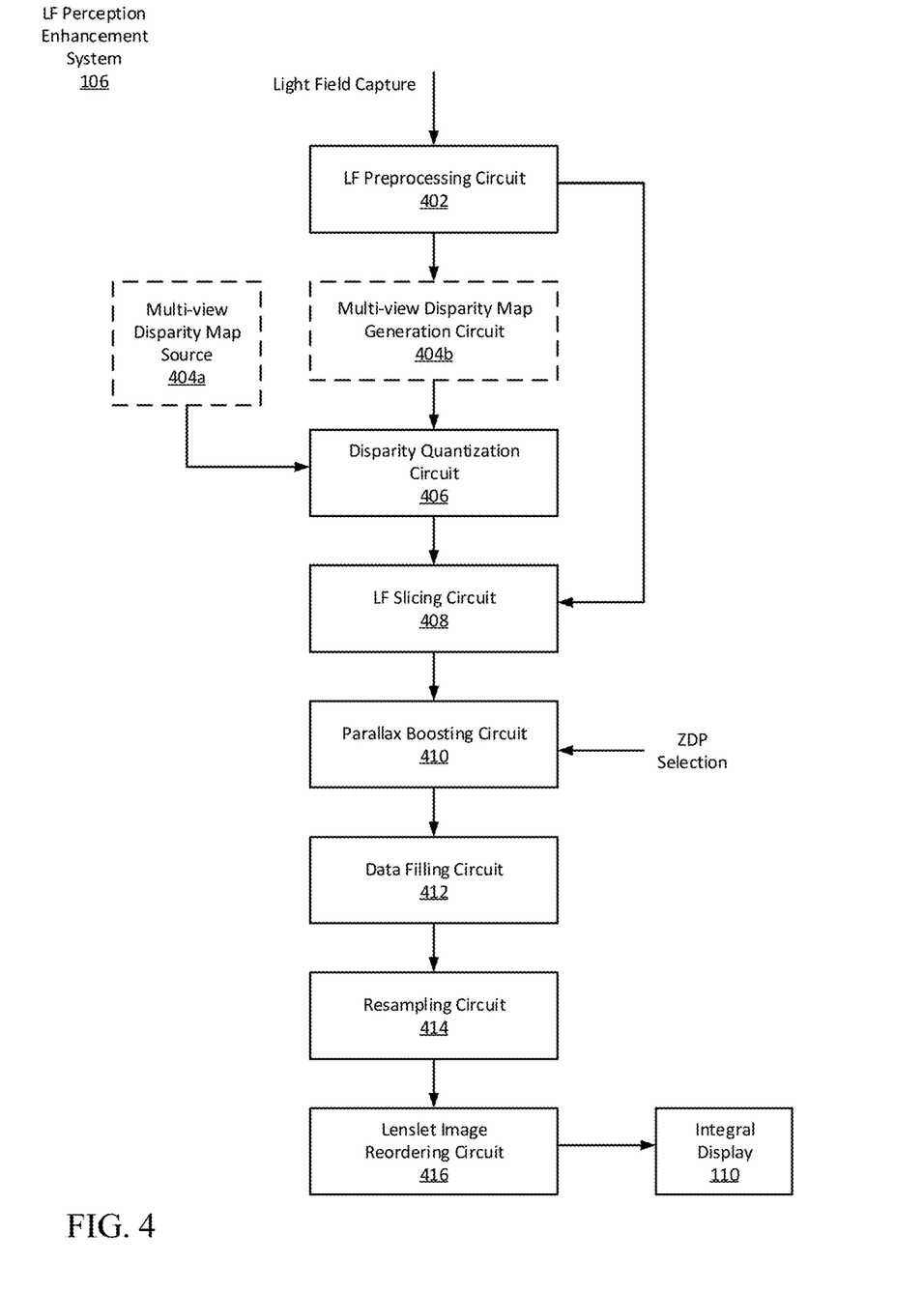
FIG. 4 is a more detailed block diagram of a light field perception enhancement system, configured in accordance with certain embodiments of the present disclosure.

FIG. 4 is a more detailed block diagram of a light field perception enhancement system 106, configured in accordance with certain embodiments of the present disclosure. The light field (LF) perception enhancement system 106 is shown to include an LF preprocessing circuit 402, a disparity quantization circuit 406, an LF slicing circuit 408, a parallax boosting circuit 410, a data filling circuit 412, a resampling circuit 414, and a lenslet image reordering circuit 416.

The LF preprocessing circuit 402 is configured to receive captured LF views, for example from a plenoptic camera, a multi-camera array, or any other suitable light field imaging device 102. The preprocessing circuit may extract the raw images, for example into a rectangular grid, from the lenslet image of the LF imager 102 which may be provided in a hexagonal grid format. In some embodiments, LF preprocessing circuit 402 is configured to perform noise-filtering, color correction, and/or image rectification on the LF views, using known techniques in light of the present disclosure. Such preprocessing may improve the results obtained from subsequent operations described below.

The disparity quantization circuit 406 is configured to receive a disparity map associated with each LF view and to quantize the disparity map into multiple planes, where each disparity plane is associated with a range of depth values. In some embodiments, the multi-view disparity maps may be provided from any suitable source 404a, such as, for example, a depth camera. In some embodiments, the disparity maps may be estimated from the light field views, by a multi-view disparity map generation circuit 404b. For example the disparities can be estimated through block matching techniques applied to horizontal and vertical pairs of regions of the light field view data. The range of depth values associated with each disparity plane (i.e., the level of quantization) may be selected based on preference for image quality versus computational requirements. A greater number of disparity planes with finer quantization may improve display results provided that the original disparity maps have sufficient accuracy to support the finer quantization.

The LF slicing circuit 408 is configured to slice the LF view into layers, wherein each layer comprises pixels of the LF view associated with one of the disparity planes. That is to say, the LF views are sliced such that pixels which are close together in depth (i.e., belonging to the same quantization level of the associated disparity map) are consolidated together on the same slice. Selection of the number of slices involves a tradeoff between improved parallax boosting and data filling operations, as described below, and computational burden. Additionally, there is an upper bound on the number of LF slices that is imposed by the subpixel accuracy of the estimated disparity maps.

Figure 6:
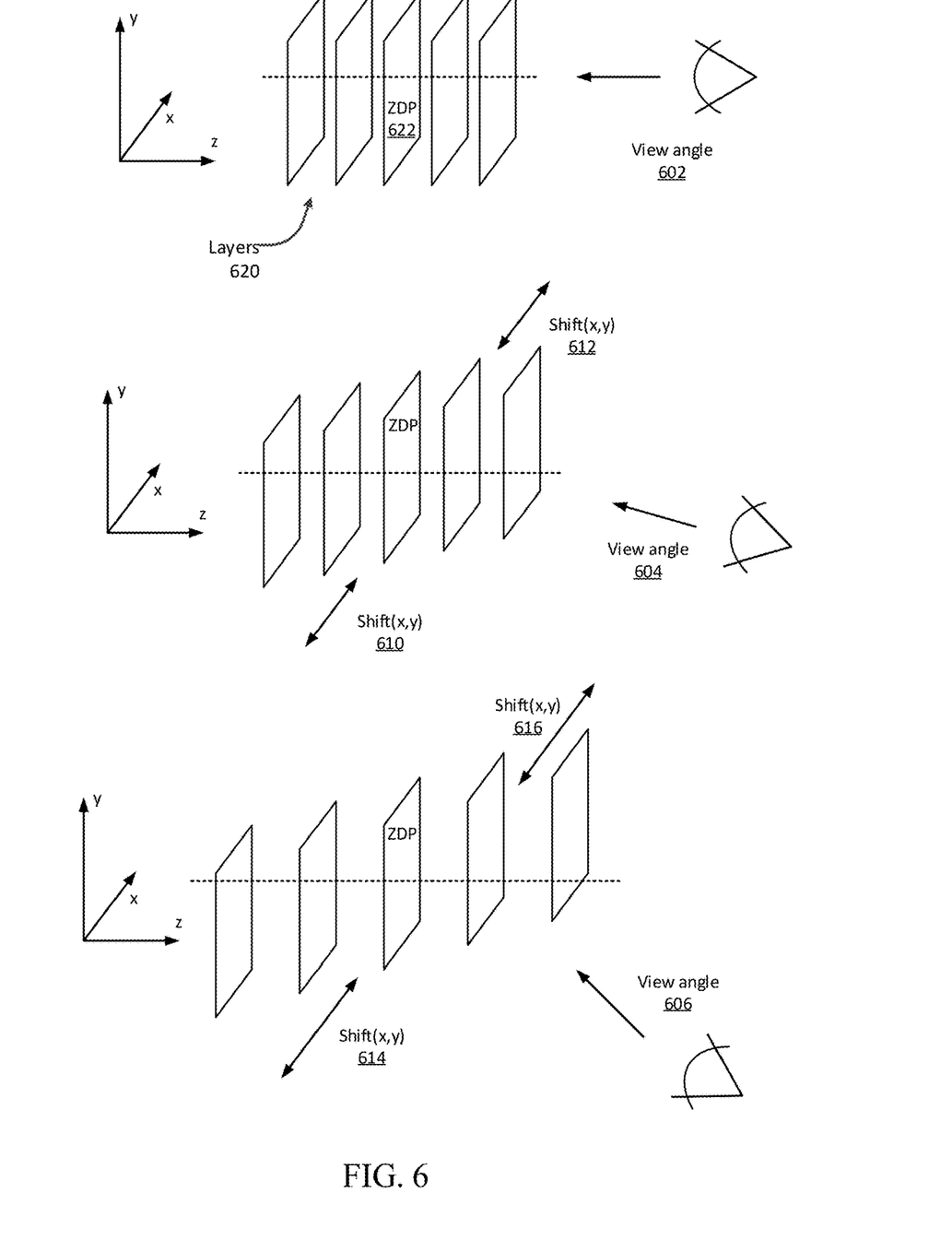
FIG. 6 illustrates parallax boosting relative to the zero depth plane, in accordance with certain embodiments of the present disclosure.

The parallax boosting circuit 410 is configured to shift or translate each of the layers in a lateral direction (e.g., in the plane of the layer or x,y plane) by an offset distance. The offset distance is based on the viewing angle associated with the LF view and on the depth values of the disparity plane associated with that view. This is illustrated in FIG. 6, for example, where the shift 610, 612 in the x,y plane is shown to vary depending on the viewing angle 602, 604, 606 and as a function of the depth of the view layer with respect to the zero disparity plane (ZDP) along the z axis. The parallax boosting circuit 410 is further configured to scale the offset distance to control perceived depth of field of the synthesized LF view and to enable selection of one of the disparity planes as a reference disparity plane (the ZDP in FIG. 6), for which the associated LF view layer is not shifted.

In some embodiments, a user of the system can set operational parameters to control aspects of the parallax boosting effect. For example, a scale factor for the maximum shift (in pixels), DIncrement, can be selected to control the perceived depth of field which induces stretching and compressing effects in the perceived 3D image at the integral display. The parameter, DIncrement, is upper-bounded by the physical depth of field of the integral display, which in turn is imposed by the angular resolution of the display (e.g., the number of pixels beneath each microlens). This can result in aliasing artifacts if a certain threshold is exceeded. If DIncrement is set to zero, then no parallax boosting (or subsequent data filling) is performed and the LF content is displayed in the same manner it was captured. Additionally, the user can select the ZDP reference plane, for example in normalized coordinates ranging from 0 to 1. A ZDP=0 can create a "pop-up" mode where images are shifted with respect to the background, a ZDP=0.5 can create a "halved" mode where image shifting is split with respect to the central layer, and a ZDP=1 can create a virtual mode where images are shifted with respect to the front layer. Selection of ZDP can thus enable the translation of the rendered depth of field forward through the display surface, generating floating objects above the screen and virtual objects beneath the screen.

The sliced layers for each of the views are translated in the appropriate x,y directions relative to their normalized angular and disparity values with respect to a reference plane (e.g., the ZDP) according to the following equations:

$$Shift_{x_{i,k}} = \lfloor Ang_{x_i} * (QuantD_k - ZDP) * DIncrement \rfloor$$

$$Shift_{y_{j,k}} = \lfloor Ang_{y_j} * (QuantD_k - ZDP) * DIncrement \rfloor$$

where $Ang_x$, $Ang_y$ are the normalized angular coordinates, for example in the range [−0.5, 0.5] and indexed by i and j; QuantD is the normalized quantized depth map, for example in the range [0,1] and indexed by k; and the rounding operator $\lfloor . \rfloor$ signifies rounding to the nearest integer for improved data filling. As can be seen from these equations, and as illustrated in FIG. 6, the slice of the central view ($Ang_{x_i} = Ang_{y_j} = 0$) corresponding to the ZDP will undergo no shifting ($Shift_x = Shift_y = 0$), while the slice at the most extreme view angle and farthest distance from the reference plane will undergo the largest shifts.

The parallax boosting circuit 410 is further configured to merge the shifted layers to generate a synthesized LF view with increased parallax. The slices are merged together, for example in ascending depth order, such that the upper layers (e.g., closer to the viewer) may overwrite the underlying layers to support occlusion of objects or regions as seen from the observer's position or perspective.

The data filling circuit 412 is configured to perform nearest interpolation and median filtering on the synthesized LF view to generate data to fill occluded regions of the synthesized LF view. As a consequence of the parallax boost, new views are synthesized that may include different occluded objects. Pixels in the lower layers within the occlusion areas will be overwritten by pixels in the upper layers, while pixels in the non-occluded areas affected by the translating shifts will have missing data (e.g., black regions) that require filling. As described previously, in some embodiments, the slice translations may be constrained to integer values so that intensity values at slice boundaries are not be spread over neighboring pixels. This improves data filling in the dark regions since the boundary pixels will be utilized to interpolate the missing data. A nearest interpolation technique provides data filling while maintaining sharpness. Subsequent application of a median filter, for example using a window size on the order of 3×3 pixels, removes odd pixels in the filled regions.

The resampling circuit 414 is configured to perform spatial and angular resampling of the synthesized LF view to match the display device resolution. The LF resolution at the display stage typically differs from the resolution at the image capture stage, for example due to optimizations to improve the viewing zone (also referred to as the eyebox) and depth of field, while maintaining a desired spatio-angular resolution. Thus resampling circuit 414 is employed to perform linear interpolation in the spatial domain followed by interpolation in the angular domain to match the resolution specifications for the display device.

The lenslet image reordering circuit 416 is configured to reorder the synthesized LF view images so that pixels corresponding to the same spatial indices are stacked together to form the lenslet image to be displayed beneath an associated microlens. Said differently, the first spatial pixel across all of the images are stacked together to be projected through the same microlens, the second spatial pixel across all of the images are stacked together to be projected through another microlens, etc.

The resulting synthesized LF view images may then be displayed through the integral display device providing a 3D viewing experience with increased parallax as the user moves within the eyebox of the display. Additionally, in some embodiments the system is configured to enable the user to experience different modes of display by adjusting operational parameters. For example, as described above, the ZDP can be adjusted to affect the translation of rendered objects through the display surface, and the translation scale factor (DIncrment) can be adjusted to stretch or compress the rendered depth of field. The parameters may be adjusted dynamically and the operations, from LF slicing to Lenslet Reordering, may be repeated to update the lenslet image.

Figure 5:
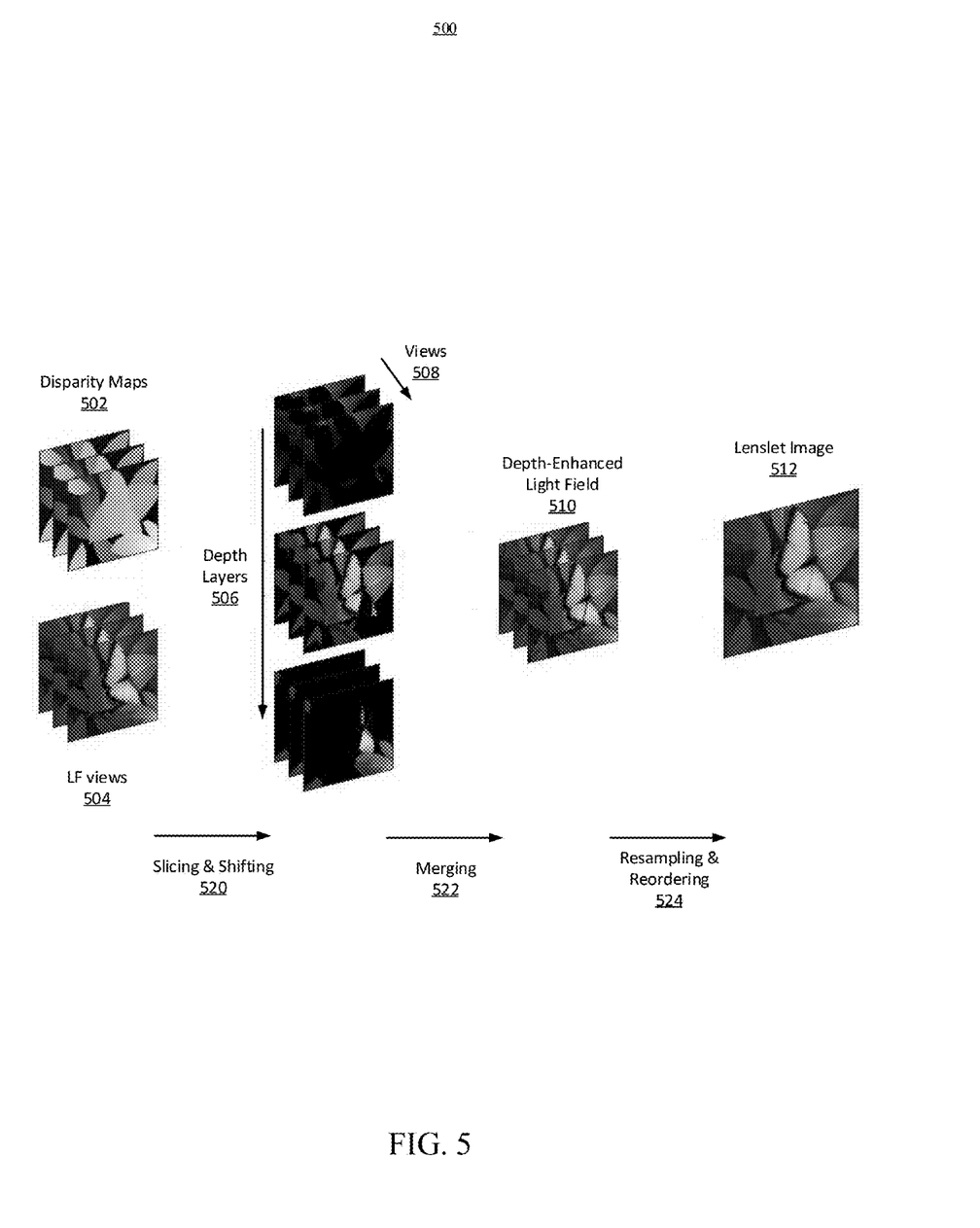
FIG. 5 illustrates a processing flow of light field views and disparity map planes, in accordance with certain embodiments of the present disclosure.

FIG. 5 illustrates a processing flow 500 of light field views and disparity map planes, in accordance with certain embodiments of the present disclosure. As described above, LF views 504 and associated disparity maps 502 are provided for processing by LF perception enhancement system 106. In this example, 3 LF views and 3 depth layers are illustrated for simplicity. The views are sliced into layers based on depth 506. At any given depth, there may be multiple sliced views 508 associated with different viewing angles. After shifting, the view slices and recombined or merged into depth-enhanced light field views 510 which are resampled and reordered, as described above, to generate synthesized LF view images. A resulting lenslet image 512 is shown, which will be displayed beneath the microlenses of the integral display.

FIG. 6 illustrates parallax boosting relative to the zero depth plane, in accordance with certain embodiments of the present disclosure. Three examples of view slice shifting are shown, corresponding to different viewing angles 602, 604, 606 in an x,y,z axis coordinate system. The illustrated shifting is restricted to the horizontal, or x axis direction, as the viewing angle rotates about the y axis, for simplicity of illustration. The view slice layers 620 are in the x,y plane, while depth runs along the z axis from one layer to the next. In all three examples, the ZDP plane is selected at the depth midpoint (e.g., ZDP=0.5).

For viewing angle 602, which is straight on, no shifting or translating is needed or performed. This follows from the shift equation above, where Angx and Angy are zero for straight on viewing. As the viewing angle 604 shifts to the left (negative x axis direction), the layers behind the ZDP shift to the left 610 and the layers in front of the ZDP shift to the right 612. The shift increases with distance from the ZDP. Continuing with this example, as the viewing angle 606 shifts still further to the left, the layers continue to shift still further to the left 614 and right 616. A similar shifting effect would be seen in they direction if the viewing angle changed to a lower or higher position.

Methodology

Figure 7:
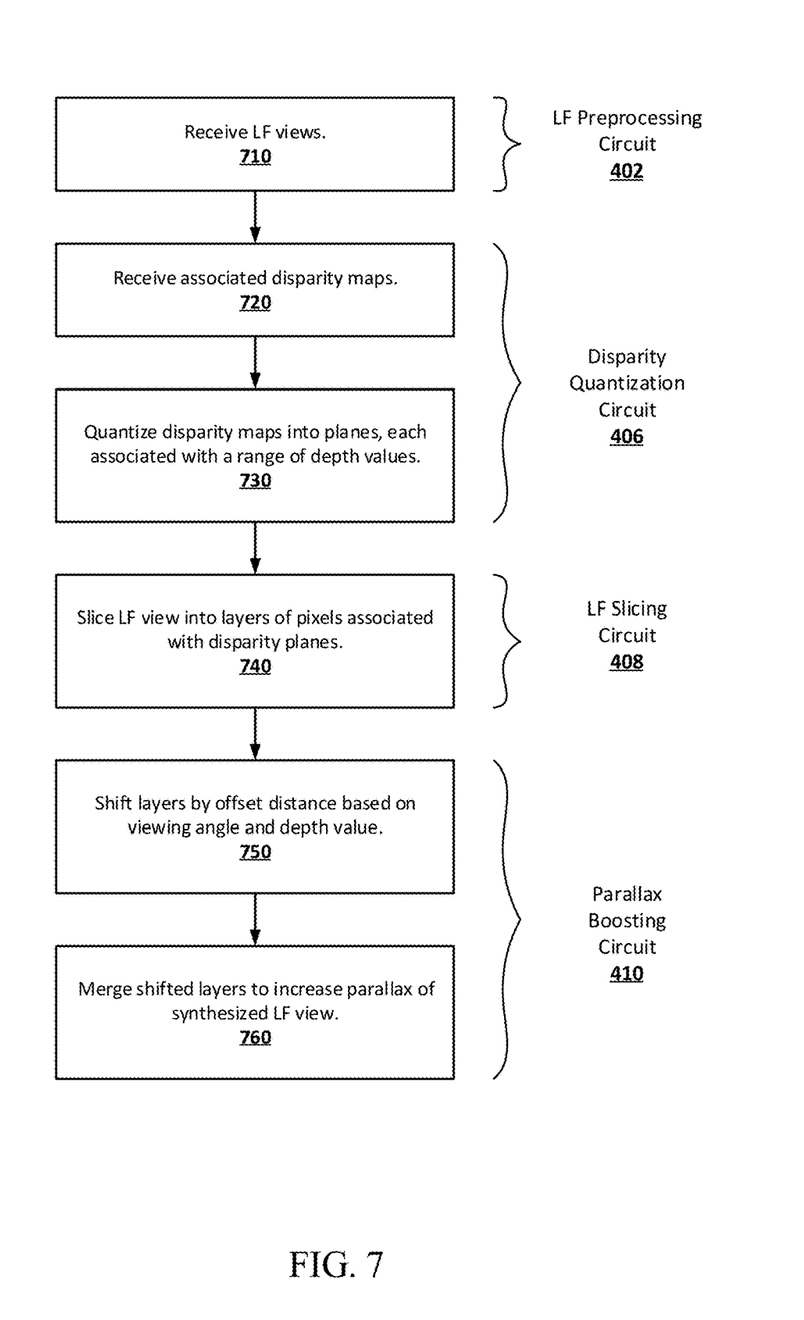
FIG. 7 is a flowchart illustrating a methodology for light field perception enhancement, in accordance with certain embodiments of the present disclosure.

FIG. 7 is a flowchart illustrating an example method 700 for light field perception enhancement, in accordance with certain embodiments of the present disclosure. As can be seen, example method 700 includes a number of phases and sub-processes, the sequence of which may vary from one embodiment to another. However, when considered in the aggregate, these phases and sub-processes form a process for light field perception enhancement in accordance with certain of the embodiments disclosed herein. These embodiments can be implemented, for example using the system architecture illustrated in FIG. 4 as described above. However other system architectures can be used in other embodiments, as will be apparent in light of this disclosure. To this end, the correlation of the various functions shown in FIG. 7 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 700. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 7, in one embodiment, method 700 for light field perception enhancement commences by receiving, at operation 710, one or more LF views. In some embodiments, the LF views may be generated by a plenoptic camera, a multi-camera array, or any other suitable light field imager.

Next, at operation 720, disparity maps associated with each of the LF views are also received. In some embodiments, the disparity maps may be generated by a depth camera. In some embodiments, the disparity maps may be estimated, for example through block matching techniques applied to horizontal and vertical pairs of regions of the light field view data.

At operation 730, the disparity maps are quantized into a desired number of planes. Each disparity plane is associated with a selected range of depth values. At operation 740, the LF view is sliced into multiple layers. Each layer comprises pixels of the LF view associated with one of the disparity planes. Said differently, each slice or layer is associated with a depth range.

At operation 750, each of the layers is shifted in a lateral direction (e.g., in the x, y plane) by an offset distance to boost the parallax effect. The offset distance is calculated based on the viewing angle associated with the LF view and on the depth values associated with that layer with respect to the ZDP. In some embodiments, the offset distance may be scaled to control perceived depth of field of the synthesized LF view. Additionally, one of the disparity planes may be selected as a reference disparity plane for which the associated LF view layer is not shifted.

At operation 760, the shifted layers are merged to generate synthesized LF views with enhanced perception due to the increased parallax. In some embodiments, the synthesized LF views may be displayed on an integral display configured to provide 3-dimensional viewing.

Of course, in some embodiments, additional operations may be performed, as previously described in connection with the system. For example, nearest interpolation and median filtering may be performed on the synthesized LF view to generate data to fill occluded regions that may result from application of these techniques.

Further additional operations may include performing spatial and angular resampling of the synthesized LF view to match the display device resolution of the target display device (e.g., the integral display). In some embodiments, the LF views may be preprocessed for noise-filtering, color correction, and/or image rectification.

Example System

Figure 8:
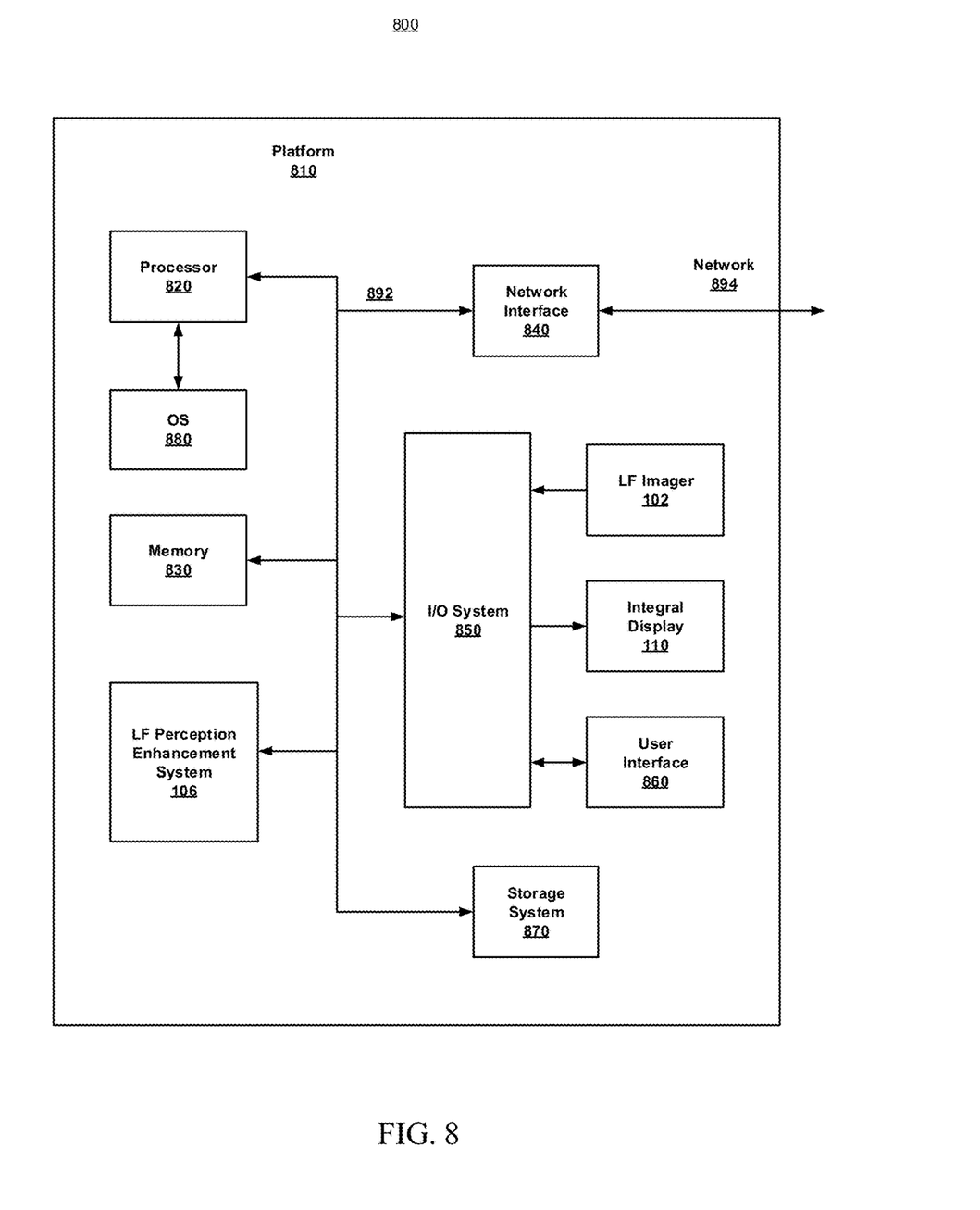
FIG. 8 is a block diagram schematically illustrating a system platform to perform light field perception enhancement, configured in accordance with certain embodiments of the present disclosure.

FIG. 8 illustrates an example system 800 to perform light field perception enhancement, configured in accordance with certain embodiments of the present disclosure. In some embodiments, system 800 comprises a platform 810 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, a television (TV), a smart TV, a TV receiver/converter or set top box, and so forth. Any combination of different devices may be used in certain embodiments.

In some embodiments, platform 810 may comprise any combination of a processor 820, a memory 830, light field perception enhancement system 106, a network interface 840, an input/output (I/O) system 850, LF Imager 102, integral display 110, a user interface 860 and a storage system 870. As can be further seen, a bus and/or interconnect 892 is also provided to allow for communication between the various components listed above and/or other components not shown. Platform 810 can be coupled to a network 894 through network interface 840 to allow for communications with other computing devices, platforms or resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor or a graphics processing unit, to assist in control and processing operations associated with system 800. In some embodiments, the processor 820 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

In some embodiments, the disclosed techniques for LF perception enhancement can be implemented in a parallel fashion, where tasks may be distributed across multiple CPU/GPU cores or other cloud based resources to enable real-time processing from image capture to display.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), or Linux. As will be appreciated in light of this disclosure, the techniques provided herein can be implemented without regard to the particular operating system provided in conjunction with system 800, and therefore may also be implemented using any suitable existing or subsequently-developed platform.

Network interface circuit 840 can be any appropriate network chip or chipset which allows for wired and/or wireless connection between other components of computer system 800 and/or network 894, thereby enabling system 800 to communicate with other local and/or remote computing systems, servers, cloud-based servers and/or resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of computer system 800. I/O devices may include, but not be limited to, LF imager 102, integral display 110, user interface 860, and other devices not shown such as a keyboard, mouse, microphone, and speaker, etc.

It will be appreciated that in some embodiments, the various components of the system 800 may be combined or integrated in a system-on-a-chip (SoC) architecture. In some embodiments, the components may be hardware components, firmware components, software components or any suitable combination of hardware, firmware or software.

LF perception enhancement system 106 is configured to provide enhanced 3D display of light fields on integral displays using parallax boosting techniques. These techniques use disparity maps to slice the LF views into multiple planes which may then be laterally shifted, based on viewing angle and distance to the ZDP, and then recombined into a synthesized LF view with increased parallax. LF perception enhancement system 106 may include any or all of the components illustrated in FIGS. 1-5, as described above. LF perception enhancement system 106 can be implemented or otherwise used in conjunction with a variety of suitable software and/or hardware that is coupled to or that otherwise forms a part of platform 810. LF perception enhancement system 106 can additionally or alternatively be implemented or otherwise used in conjunction with user I/O devices that are capable of providing information to, and receiving information and commands from, a user. These I/O devices may include devices collectively referred to as user interface 860. In some embodiments, user interface 860 may include a textual input device such as a keyboard, and a pointer-based input device such as a mouse. Other input/output devices that may be used in other embodiments include a touchscreen, a touchpad, a microphone, and/or a speaker. Still other input/output devices can be used in other embodiments. Further examples of user input may include gesture or motion recognition and facial tracking.

In some embodiments, LF perception enhancement system 106 may be installed local to system 800, as shown in the example embodiment of FIG. 8. Alternatively, system 800 can be implemented in a client-server arrangement wherein at least some functionality associated with these circuits is provided to system 800 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 894 or remotely coupled to network 894 by one or more other networks and/or communication channels. In some cases access to resources on a given network or computing system may require credentials such as usernames, passwords, and/or compliance with any other suitable security mechanism.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the LF perception enhancement methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. In other embodiments, the functionalities disclosed herein can be incorporated into other software applications, such as virtual reality applications, gaming applications, entertainment applications, and/or other video processing applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for light field (LF) perception enhancement. The method comprises: receiving, by a processor, one or more LF views; quantizing, by the processor, a disparity map associated with each of the LF views into a plurality of planes, each plane associated with a range of depth values, the range based on the quantization; slicing, by the processor, the LF view into a plurality of layers, wherein each layer comprises pixels of the LF view associated with one of the planes; shifting, by the processor, each of the layers in a lateral direction by an offset distance based on a viewing angle associated with the LF view and further based on a distance between the associated plane and a reference plane; and merging, by the processor, the shifted layers to generate a synthesized LF view with increased parallax.

Example 2 includes the subject matter of Example 1, further comprising performing nearest interpolation and median filtering on the synthesized LF view to generate data to fill occluded regions of the synthesized LF view.

Example 3 includes the subject matter of Examples 1 or 2, further comprising performing spatial and angular resampling of the synthesized LF view to match a display device resolution.

Example 4 includes the subject matter of any of Examples 1-3, further comprising displaying the synthesized LF view on an integral display configured to provide 3-dimensional viewing.

Example 5 includes the subject matter of any of Examples 1-4, further comprising preprocessing of the LF views, the preprocessing comprising one or more of noise-filtering, color correction, and image rectification.

Example 6 includes the subject matter of any of Examples 1-5, further comprising scaling the offset distance to control perceived depth of field of the synthesized LF view.

Example 7 includes the subject matter of any of Examples 1-6, further comprising selecting one of the planes as the reference plane for which the associated LF view layer is not shifted.

Example 8 includes the subject matter of any of Examples 1-7, further comprising receiving the LF views from one of a plenoptic camera and a multi-camera array.

Example 9 is a system for light field (LF) perception enhancement. The system comprises: an LF preprocessing circuit to receive one or more LF views; a disparity quantization circuit to receive a disparity map associated with each LF view and to quantize the disparity map into a plurality of planes, each plane associated with a range of depth values, the range based on the quantization; an LF slicing circuit to slice the LF view into a plurality of layers, wherein each layer comprises pixels of the LF view associated with one of the planes; and a parallax boosting circuit to shift each of the layers in a lateral direction by an offset distance based on a viewing angle associated with the LF view and further based on a distance between the associated plane and a reference plane, and further to merge the shifted layers to generate a synthesized LF view with increased parallax.

Example 10 includes the subject matter of Example 9, further comprising a data filling circuit to perform nearest interpolation and median filtering on the synthesized LF view to generate data to fill occluded regions of the synthesized LF view.

Example 11 includes the subject matter of Examples 9 or 10, further comprising a resampling circuit to perform spatial and angular resampling of the synthesized LF view to match a display device resolution.

Example 12 includes the subject matter of any of Examples 9-11, further comprising an integral display configured to provide 3-dimensional viewing of the synthesized LF view.

Example 13 includes the subject matter of any of Examples 9-12, wherein the LF preprocessing circuit is further to perform one or more of noise-filtering, color correction, and image rectification on the received LF views.

Example 14 includes the subject matter of any of Examples 9-13, wherein the parallax boosting circuit is further to scale the offset distance to control perceived depth of field of the synthesized LF view.

Example 15 includes the subject matter of any of Examples 9-14, wherein the parallax boosting circuit is further to enable selection of one of the planes as the reference plane for which the associated LF view layer is not shifted.

Example 16 includes the subject matter of any of Examples 9-15, further comprising one of a plenoptic camera and a multi-camera array, to capture the LF views.

Example 17 is at least one non-transitory computer readable storage medium having instructions encoded thereon that, when executed by one or more processors, result in the following operations for light field (LF) perception enhancement. The operations comprise: receiving one or more LF views; quantizing a disparity map associated with each of the LF views into a plurality of planes, each plane associated with a range of depth values, the range based on the quantization; slicing the LF view into a plurality of layers, wherein each layer comprises pixels of the LF view associated with one of the planes; shifting each of the layers in a lateral direction by an offset distance based on a viewing angle associated with the LF view and further based on a distance between the associated plane and a reference plane; and merging the shifted layers to generate a synthesized LF view with increased parallax.

Example 18 includes the subject matter of Example 17, the operations further comprising performing nearest interpolation and median filtering on the synthesized LF view to generate data to fill occluded regions of the synthesized LF view.

Example 19 includes the subject matter of Examples 17 or 18, further comprising performing spatial and angular resampling of the synthesized LF view to match a display device resolution.

Example 20 includes the subject matter of any of Examples 17-19, further comprising displaying the synthesized LF view on an integral display configured to provide 3-dimensional viewing.

Example 21 includes the subject matter of any of Examples 17-20, further comprising preprocessing of the LF views, the preprocessing comprising one or more of noise-filtering, color correction, and image rectification.

Example 22 includes the subject matter of any of Examples 17-21, further comprising scaling the offset distance to control perceived depth of field of the synthesized LF view.

Example 23 includes the subject matter of any of Examples 17-22, further comprising selecting one of the planes as the reference plane for which the associated LF view layer is not shifted.

Example 24 includes the subject matter of any of Examples 17-23, further comprising receiving the LF views from one of a plenoptic camera and a multi-camera array.

Example 25 is a system for light field (LF) perception enhancement. The system comprises: means for receiving one or more LF views; means for quantizing a disparity map associated with each of the LF views into a plurality of planes, each plane associated with a range of depth values, the range based on the quantization; means for slicing the LF view into a plurality of layers, wherein each layer comprises pixels of the LF view associated with one of the planes; means for shifting each of the layers in a lateral direction by an offset distance based on a viewing angle associated with the LF view and further based on a distance between the associated plane and a reference plane; and means for merging the shifted layers to generate a synthesized LF view with increased parallax.

Example 26 includes the subject matter of Example 25, further comprising means for performing nearest interpolation and median filtering on the synthesized LF view to generate data to fill occluded regions of the synthesized LF view.

Example 27 includes the subject matter of Examples 25 or 26, further comprising means for performing spatial and angular resampling of the synthesized LF view to match a display device resolution.

Example 28 includes the subject matter of any of Examples 25-27, further comprising means for displaying the synthesized LF view on an integral display configured to provide 3-dimensional viewing.

Example 29 includes the subject matter of any of Examples 25-28, further comprising means for preprocessing of the LF views, the preprocessing comprising one or more of noise-filtering, color correction, and image rectification.

Example 30 includes the subject matter of any of Examples 25-29, further comprising means for scaling the offset distance to control perceived depth of field of the synthesized LF view.

Example 31 includes the subject matter of any of Examples 25-30, further comprising means for selecting one of the planes as the reference plane for which the associated LF view layer is not shifted.

Example 32 includes the subject matter of any of Examples 25-31, further comprising means for receiving the LF views from one of a plenoptic camera and a multi-camera array.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for light field (LF) perception enhancement, the method comprising:
   receiving, by a processor, one or more LF views;
   quantizing, by the processor, a disparity map associated with each of the LF views into a plurality of planes, each plane associated with a range of depth values, the range based on the quantization;
   slicing, by the processor, the LF view into a plurality of layers, wherein each layer comprises pixels of the LF view associated with one of the planes;
   shifting, by the processor, each of the layers in a lateral direction by an offset distance based on a viewing angle associated with the LF view and further based on a distance between the associated plane and a reference plane; and merging, by the processor, the shifted layers to generate a synthesized LF view with increased parallax.

2. The method of claim 1, further comprising performing nearest interpolation and median filtering on the synthesized LF view to generate data to fill occluded regions of the synthesized LF view.

3. The method of claim 1, further comprising performing spatial and angular resampling of the synthesized LF view to match a display device resolution.

4. The method of claim 1, further comprising displaying the synthesized LF view on an integral display configured to provide 3-dimensional viewing.

5. The method of claim 1, further comprising preprocessing of the LF views, the preprocessing comprising one or more of noise-filtering, color correction, and image rectification.

6. The method of claim 1, further comprising scaling the offset distance to control perceived depth of field of the synthesized LF view.

7. The method of claim 1, further comprising selecting one of the planes as the reference plane for which the associated LF view layer is not shifted.

8. The method of claim 1, further comprising receiving the LF views from one of a plenoptic camera and a multi-camera array.

9. A system for light field (LF) perception enhancement, the system comprising:
an LF preprocessing circuit to receive one or more LF views;
a disparity quantization circuit to receive a disparity map associated with each LF view and to quantize the disparity map into a plurality of planes, each plane associated with a range of depth values, the range based on the quantization;
an LF slicing circuit to slice the LF view into a plurality of layers, wherein each layer comprises pixels of the LF view associated with one of the planes; and
a parallax boosting circuit to shift each of the layers in a lateral direction by an offset distance based on a viewing angle associated with the LF view and further based on a distance between the associated plane and a reference plane, and further to merge the shifted layers to generate a synthesized LF view with increased parallax.

10. The system of claim 9, further comprising a data filling circuit to perform nearest interpolation and median filtering on the synthesized LF view to generate data to fill occluded regions of the synthesized LF view.

11. The system of claim 9, further comprising a resampling circuit to perform spatial and angular resampling of the synthesized LF view to match a display device resolution.

12. The system of claim 9, further comprising an integral display configured to provide 3-dimensional viewing of the synthesized LF view.

13. The system of claim 9, wherein the LF preprocessing circuit is further to perform one or more of noise-filtering, color correction, and image rectification on the received LF views.

14. The system of claim 9, wherein the parallax boosting circuit is further to scale the offset distance to control perceived depth of field of the synthesized LF view.

15. The system of claim 9, wherein the parallax boosting circuit is further to enable selection of one of the planes as the reference plane for which the associated LF view layer is not shifted.

16. The system of claim 9, further comprising one of a plenoptic camera and a multi-camera array, to capture the LF views.

17. At least one non-transitory computer readable storage medium having instructions encoded thereon that, when executed by one or more processors, result in the following operations for light field (LF) perception enhancement, the operations comprising:
receiving one or more LF views;
quantizing a disparity map associated with each of the LF views into a plurality of planes, each plane associated with a range of depth values, the range based on the quantization;
slicing the LF view into a plurality of layers, wherein each layer comprises pixels of the LF view associated with one of the planes;
shifting each of the layers in a lateral direction by an offset distance based on a viewing angle associated with the LF view and further based on a distance between the associated plane and a reference plane; and
merging the shifted layers to generate a synthesized LF view with increased parallax.

18. The computer readable storage medium of claim 17, the operations further comprising performing nearest interpolation and median filtering on the synthesized LF view to generate data to fill occluded regions of the synthesized LF view.

19. The computer readable storage medium of claim 17, further comprising performing spatial and angular resampling of the synthesized LF view to match a display device resolution.

20. The computer readable storage medium of claim 17, further comprising displaying the synthesized LF view on an integral display configured to provide 3-dimensional viewing.

21. The computer readable storage medium of claim 17, further comprising preprocessing of the LF views, the preprocessing comprising one or more of noise-filtering, color correction, and image rectification.

22. The computer readable storage medium of claim 17, further comprising scaling the offset distance to control perceived depth of field of the synthesized LF view.

23. The computer readable storage medium of claim 17, further comprising selecting one of the planes as the reference plane for which the associated LF view layer is not shifted.

24. The computer readable storage medium of claim 17, further comprising receiving the LF views from one of a plenoptic camera and a multi-camera array.

* * * * *